US 7,024,162 B2

(12) United States Patent
Muthuswamy et al.

(10) Patent No.: US 7,024,162 B2
(45) Date of Patent: Apr. 4, 2006

(54) COMMUNICATION SYSTEM WITH CALL QUALITY INDICATION AND METHOD OF OPERATION THEREIN

(75) Inventors: Sivakumar Muthuswamy, Plantation, FL (US); Anupama Ramamurthy, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 122 days.

(21) Appl. No.: 10/400,316

(22) Filed: Mar. 27, 2003

(65) Prior Publication Data
US 2004/0192290 A1 Sep. 30, 2004

(51) Int. Cl.
*H04B 17/00* (2006.01)

(52) U.S. Cl. ............... 455/67.11; 455/67.7; 455/67.13; 455/226.2; 455/226.4

(58) Field of Classification Search ............... 455/67.7, 455/67.11, 67.13, 226.4, 421, 566, 155.1, 455/513, 226.2, 522
See application file for complete search history.

(56) References Cited

U.S. PATENT DOCUMENTS

| | | | | |
|---|---|---|---|---|
| 5,574,771 A | * | 11/1996 | Driessen et al. | 455/413 |
| 5,809,414 A | * | 9/1998 | Coverdale et al. | 455/421 |
| 5,991,901 A | | 11/1999 | Mulford et al. | |
| 6,236,853 B1 | * | 5/2001 | Mee et al. | 455/414.1 |
| 6,396,867 B1 | * | 5/2002 | Tiedemann et al. | 375/141 |
| 6,721,557 B1 | * | 4/2004 | Ritter | 455/423 |

* cited by examiner

*Primary Examiner*—Nay Maung
*Assistant Examiner*—Raymond S. Dean
(74) *Attorney, Agent, or Firm*—Randi L. Karpinia; Daniel C. Crilly

(57) ABSTRACT

A communication system (10) for providing call quality indication includes a plurality of communication devices (75) and a system controller (40). The plurality of communication devices (75) includes a first communication device (62) for communicating using a first radio frequency channel having a first radio frequency channel quality, and a second communication device (62) for communicating using a second radio frequency channel having a second radio frequency channel quality. The system controller (40) communicates the first radio frequency channel quality and the second radio frequency-channel quality to the first communication device (62) and the second communication device (64).

25 Claims, 4 Drawing Sheets

COMMUNICATION SYSTEM WITH CALL QUALITY INDICATION AND METHOD OF OPERATION THEREIN

BACKGROUND OF INVENTION

1. Field of the Invention

This invention relates in general to communication systems and more particularly to communication systems having call quality indication capability.

2. Description of the Related Art

Cellular telephones, PDAs (Personal Digital Assistants) and other portable electronic devices having communication capability have become fixtures of everyday life over the last several years. As they evolve, prices continue to fall while the devices' capabilities have expanded. Currently, such devices can be used in many places to make wireless connection to the Internet, play games, as well as carry out email and other messaging functions. It can readily be anticipated that as time goes by, the capabilities of such devices will continue to expand as prices continue to fall, making use of such devices a permanent part of people's daily lives.

Many factors can influence the quality of communications received and/or transmitted to/from a wireless communication device, including geography, weather, foliage and buildings. For example, stormy weather can interfere with radio frequency signals, causing poor reception/transmission quality. Similarly, in some wooded areas, you may have good reception/transmission during the winter, when there are no leaves on the trees, but poor reception/transmission in the summer or fall. Buildings and other structures may cause more or less interference with the desired communication signals, depending on the method of construction used and the design of the building or other structure.

Today, some wireless communication devices have a one-way signal strength indicator that is a rough estimator of quality of the radio frequency signal between the covering base station and the receiving wireless communication device. This indicator provides the device user with an indication of the signal quality for his/her communication device only. For example, an icon can be incorporated showing a measurement of the current signal strength between the device and the communication system. This icon, for example, can be displayed on a display of the device. Similarly, an icon to indicate that no signal reception is available can be displayed. This can be useful when the device is outside the system service area. In some devices, when the reception is so poor that the call is being terminated, a call quality alarm is sounded or displayed for the user.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages all in accordance with the present invention.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

The terms "a" or "an," as used herein, are defined as one or more. The term "plurality," as used herein, is detined as two or more. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like, as used herein, are defined as a sequence of instructions designed for execution on a computer system. A program, computer program, or software application may include a subroutine, a function, a procedure, an object method, an object implementation, an executable application, an applet, a servlet, source code, object code, a shared library/dynamic load library and/or other sequence of instructions designed for execution on a computer system.

Figure 1:
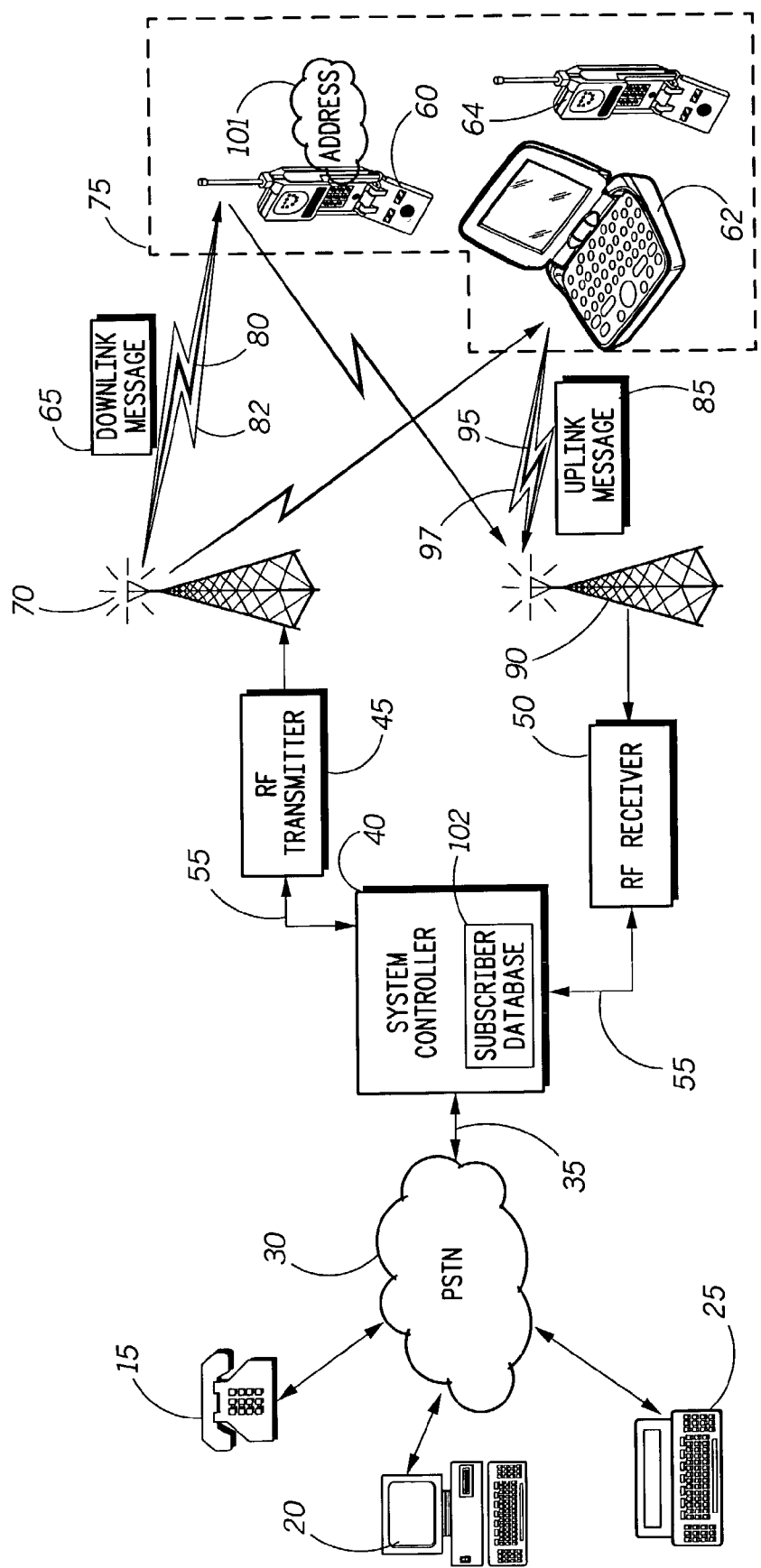
FIG. 1 is an electronic block diagram of a communication system.

Referring to FIG. 1, an electronic block diagram of a communication system 10 is shown. The communication system 10 includes a message input device for initiating messages into the communication system 10. The message input device can be, for example, a telephone 15, a computer 20, or a desktop messaging unit 25, connected through a conventional public switched telephone network (PSTN) 30 through a plurality of telephone links 35 to a system controller 40. The telephone links 35, for example, can be a plurality of twisted wire pairs, a fiber optic cable, or a multiplexed trunk line.

The system controller 40 is coupled to and oversees the operation of at least one radio frequency (RF) transmitter 45 and at least one radio frequency (RF) receiver 50 through one or more communication links 55. The communication links 55 typically are twisted pair telephone wires, and additionally can include radio frequency (RF), microwave, or other communication links. The radio frequency transmitter 45 and the radio frequency receiver 50 typically are used with message store and forward stations that encode and decode inbound and outbound messages into formats that are compatible with landline message switched computers and personal radio addressing requirements, such as cellular messages, short messaging service, or paging protocols. The system controller 40 can also function to encode and decode wireless messages that are transmitted to or received by the radio frequency transmitter 45 or the radio frequency receiver 50. Telephony signals are typically transmitted to and received from the system controller 40 by telephone sets such as the telephone 15 or a communication device 60. The system controller 40 encodes and schedules outbound messages such as a downlink message 65. The system controller 40 then transmits the encoded outbound messages through the radio frequency transmitter 45 via a transmit antenna 70 to one or more of a plurality of communication devices 75 such as the communication device 60, a first communication device 62, and/or a second communication device 64, on at least one outbound radio frequency (RF) channel 80. The downlink message 65 can be, for example, a data message or a voice call. In accordance with the present invention, each outbound radio frequency channel 80 has an outbound RF channel quality 82 associated therewith.

Similarly, the system controller 40 receives and decodes inbound messages such as an uplink message 85 received by the radio frequency receiver 50 via a receive antenna 90 on at least one inbound radio frequency (RF) channel 95 from one of the plurality of communication devices 75. The uplink message 85 can be, for example, a data message, a reply to a data message, a voice call, or a reply to a voice call. In accordance with the present invention, each inbound radio frequency channel 95 has an inbound RF channel quality 97 associated therewith.

It will be appreciated by one of ordinary skill in the art that the conununication system 10, in accordance with the present invention, can be a wireless communication system, a wired communication system, a broadcast communication system, or any other equivalent communication system. For example, the communication system 10 can function utilizing any wireless RF channel, for example, a one or two-way messaging channel, a mobile cellular telephone channel, or a mobile radio channel. Similarly, it will be appreciated by one of ordinary skill in the art that the communication system 10 can function utilizing other types of communication channels, such as infrared channels and/or Bluetooth channels. Further, it will be appreciated by one of ordinary skill in the art that the communication system 10 can function utilizing a wireline communication channel, such as a local area network (LAN), a wide area network (WAN) or a combination of both. The LAN, for example, can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or between the devices and the shared resources. The WAN, for example, can use a physical network media, such as X.25, Frame Relay, ISDN, Modem dial-up or other media, to connect devices or other local area networks. In the following description, the term "communication system" refers to any of the systems mentioned above or an equivalent.

Similarly, it will be appreciated by one of ordinary skill in the art that each of the plurality of communication devices 75, such as the communication device 60, the first communication device 62, and/or the second communication device 64, in accordance with the present invention, can be a wireless communication device, a wired communication device, a broadcast communication device, or any other equivalent communication device. For example, the communication device can be a mobile cellular telephone, a mobile radio data terminal, a mobile cellular telephone having an attached or integrated data terminal, or a two-way messaging device. Similarly, the communication device can be any other electronic device, such as a personal digital assistant or a laptop computer. In the following description, the term "communication device" refers to any of the devices mentioned above or an equivalent.

Similarly, it will be appreciated by one of ordinary skill in the art that each of the plurality of communication devices 75, such as the communication device 60, the first communication device 62, and/or the second communication device 64, in accordance with the present invention, can be a wireless communication device, a wired communication device, a broadcast communication device, or any other equivalent communication device. For example, the communication device can be a mobile cellular telephone, a mobile radio data terminal, a mobile cellular telephone having an attached or integrated data terminal, or a two-way messaging device. Similarly, the communication device can be any other electronic device such as a personal digital assistant or a laptop computer. In the following description, the term "communication device" refers to any combination of the devices mentioned above or an equivalent.

Each of the plurality of communication devices 75 assigned for use in the communication system 10 has an address or identity assigned thereto which is a unique selective call address in the communication system 10. For example, the communication device 60 assigned for use in the communication system 10 has an address 101 assigned thereto which is a unique selective call address in the communication system 10 for the communication device 60. The address 101 enables the transmission of the downlink message 65 from the system controller 40 only to the communication device 60 having the address 101, and identifies the messages and responses received at the system controller 40 from the communication device 60 with the address 101. In one embodiment, each of the plurality of communication devices 75 also has a pin number assigned thereto, the pin number being associated with a telephone number within the PSTN 30. A list of the assigned addresses and correlated telephone numbers for each of the plurality of communication devices 75 is stored in the system controller 40 in the form of a subscriber database 102.

Each of the plurality of communication devices 75 communicates using a radio frequency channel having a radio frequency channel quality. For example, the first communication device 62 communicates using a first radio frequency channel having a first radio frequency channel quality, and the second communication device 62 communicates using a second radio frequency channel having a second radio frequency channel quality. In accordance with one embodiment of the present invention, the system controller 40 communicates the first radio frequency channel quality and the second radio frequency channel quality to one or more of the plurality of communication devices 75 such as the first communication device 62 and the second communication device 64 when appropriate.

Each of the radio frequency channels used for communication can include a radio frequency inbound channel having a radio frequency inbound channel quality and a radio frequency outbound channel having a radio frequency outbound channel quality as described previously. For example, the first radio frequency channel can comprise a first radio frequency inbound channel having a first radio frequency inbound channel quality and a first radio frequency outbound channel having a first radio frequency outbound channel quality. Similarly, the second radio frequency channel can comprise a second radio frequency inbound channel having a second radio frequency inbound channel quality and a second radio frequency outbound channel having a second radio frequency outbound channel quality. The system controller 40 can then communicate the first radio frequency inbound channel quality and the first radio frequency outbound channel quality to one or more of the plurality of communication devices 75 such as the first communication device and the second communication device when appropriate. Similarly, the system controller 40 can communicate the second radio frequency inbound channel quality and the second radio frequency outbound channel quality to one or more of the plurality of communication devices 75 such as the first communication device and the second communication device when appropriate.

For example, the system controller 40 can communicate the first radio frequency channel quality and the second radio frequency channel quality to the first communication device 62 and the second communication device 64 in response to the first communication device 62 initiating a communication call to the second communication device 64. Similarly, the system controller 40 can communicate the first radio frequency channel quality and the second radio frequency channel quality to the first communication device 62 and the second communication device 64 periodically in response to the first communication device 62 and the second communication device 64 participating in a communication call. In one embodiment, the communication call is terminated when the first radio frequency channel quality is less than one or more predetermined thresholds. Alternatively, the communication call is continued when the first radio frequency channel quality is at least equal to one or more predetermined thresholds and the second radio frequency channel quality is at least equal to one or more predetermined thresholds.

In one embodiment, the subscriber database 102 of the system controller 40 includes communication information for each of the plurality of communication devices 75. For example, the subscriber database 102 can include one or more call quality threshold levels associated with one or more radio frequency channels for which each of the plurality of communication devices 75 can communicate. Further, the subscriber database 102 can include one or more alternate communication options for which each of the plurality of communication devices 75 is capable of operating. The system controller 40 is preferably programmed to compare the radio frequency channel quality of the radio frequency channel for which each of the plurality of communication devices 75 is operating to the associated threshold levels. The system controller 40 further can communicate one or more alternate communication options to each of the plurality of communication devices 75 when the associated operational radio frequency channel is below the threshold level. For example, the system controller 40 can communicate one or more alternate communication options in which the first communication device 62 is capable of operating within to the first communication device 62 when the first radio frequency channel quality is below a call quality threshold level. Similarly, the system controller 40 can communicate a different set of one or more alternate communication options in which the second communication device 64 is capable of operating within to the second communication device 64 when the second radio frequency channel quality is below the same or a different call quality threshold level.

Figure 2:
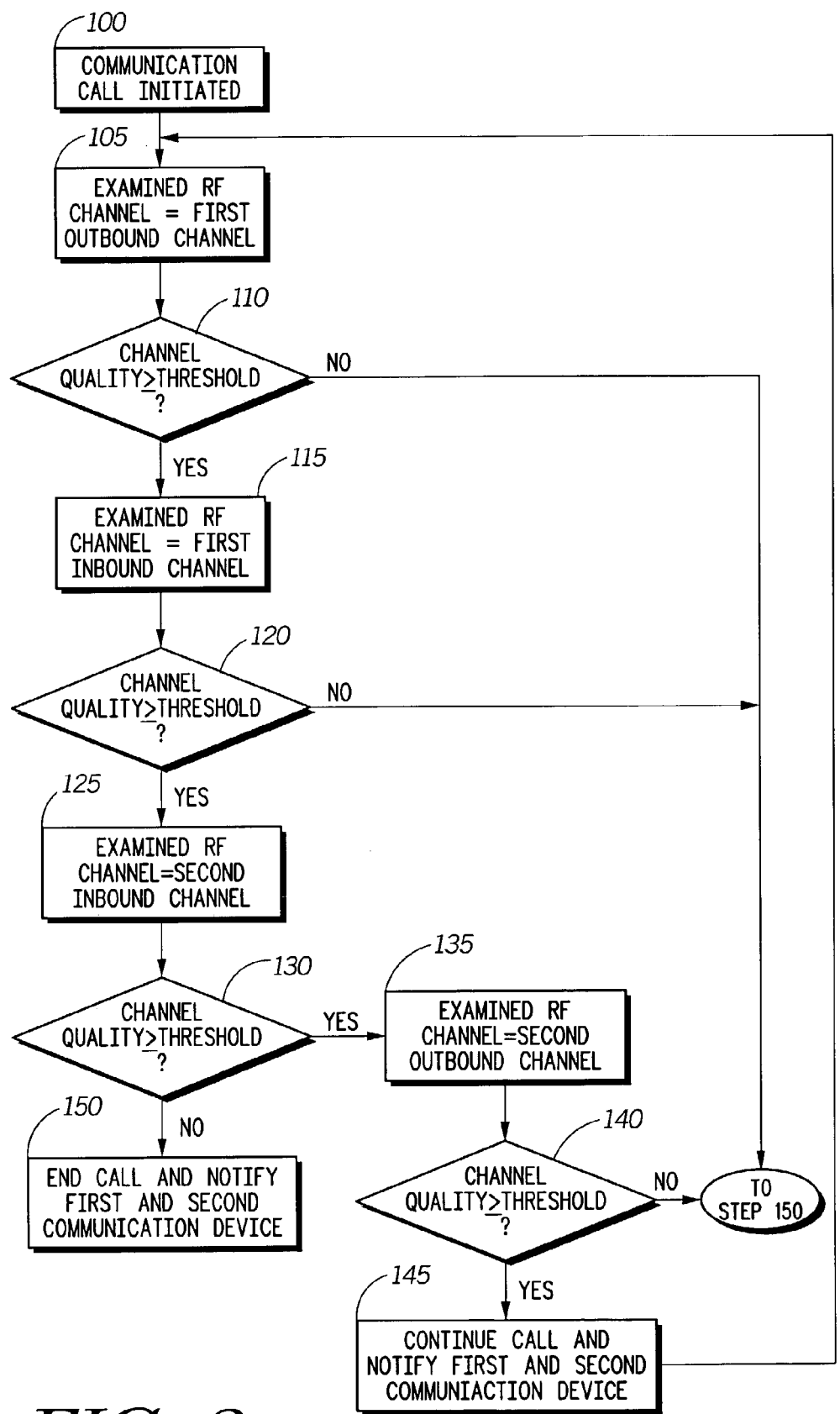
FIG. 2 is one embodiment of the operation of the communication system.

FIG. 2 is a flowchart illustrating one embodiment of the operation of the communication system 10 in accordance with the present invention. Beginning with Step 100, a communication call is initiated. For example, a first user can initiate a call from the first communication device 62 to the second communication device 64 belonging to a second user. Next, in Step 105, the examined RF channel is set to a first outbound channel. Next in Step 110, the outbound RF channel quality of the first outbound channel is compared to a predetermined threshold. For example, a first outbound RF channel quality of a first outbound RF channel associated with the first communication device, which initiated the call, is compared to a predetermined threshold. In Step 115, when the outbound RF channel quality is equal to or exceeds the predetermined threshold, the examined RF channel is set to a first inbound channel. The first inbound channel, for example, can be the inbound RF channel associated with the first communication device, which initiated the call. Next, in Step 120, the inbound RF channel quality of the first inbound channel is compared to a predetermined threshold. In Step 125, when the inbound RF channel quality of the first inbound channel is equal to or exceeds the predetermined threshold, the examined RF channel is set to a second inbound channel. The second inbound channel, for example, can be the inbound RF channel associated with the second communication device, which is the recipient of the call. Next, in Step 130, the inbound RF channel quality of the second inbound channel is compared to a predetermined threshold. In Step 135, when the inbound RF channel quality of the second inbound channel is equal to or exceeds the predetermined threshold, the examined RF channel is set to a second outbound channel. The second outbound channel, for example, can be the outbound RF channel associated with the second communication device, which is the recipient of the call. Next, in Step 140, the outbound RF channel quality of the second outbound channel is compared to a predetermined threshold. In Step 145, when the outbound RF channel quality of the second outbound channel is equal to or exceeds the predetermined threshold, the communication of the call continues. Preferably, a notification is sent to both the first and second communication devices. It will be appreciated by those of ordinary skill in the art that each outbound RF channel and each inbound RF channel can be compared to a unique predetermined threshold or alternatively can be compared to the same predetermined threshold. The process then cycles back to Step 105, and all the utilized outbound and inbound RF channels are examined for RF channel quality on a periodic basis as herein previously described.

When the RF channel quality of the examined RF channel in any of the Steps 110, 120, 130, and 140 is less than the predetermined threshold, the process continues with Step 150 in which the call is terminated. Preferably, the first and second communication devices are each notified of the call termination. Further, (not shown), and in accordance with a preferred embodiment of the present invention, the first and the second communication devices are further notified of the RF channel quality of each of the examined RF channel inbound and outbound channels.

Figure 3:
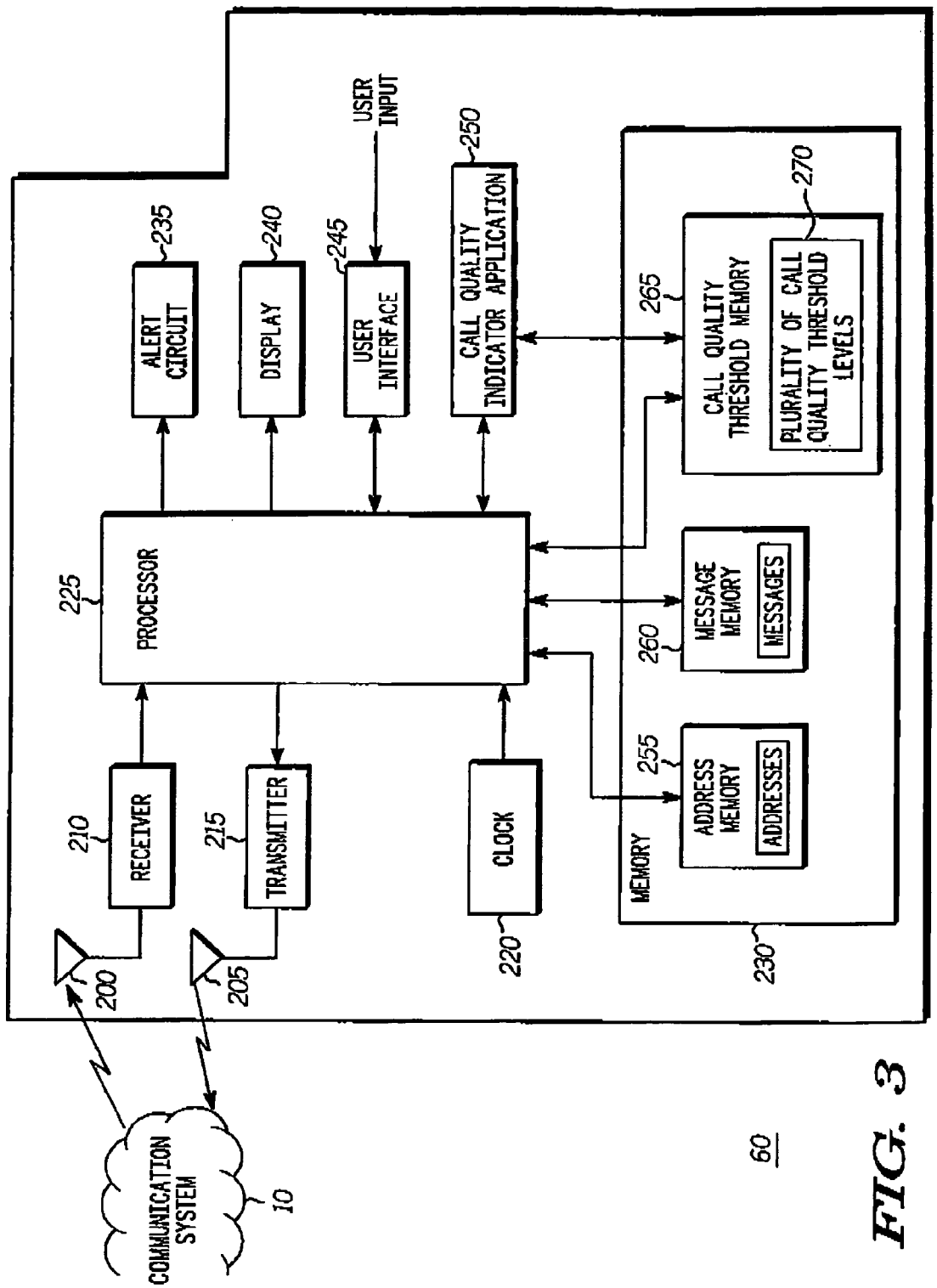
FIG. 3 is an electronic block diagram of a communication device for use within the communication system of FIG. 1.

FIG. 3 is an electronic block diagram of a communication device for use within the communication system 10 of FIG. 1. The communication device 60, for example, can be the first communication device 62, the second communication device 64, or any of the plurality of communication devices 75 of FIG. 1. As illustrated in FIG. 3, the communication device includes a first antenna 200, a second antenna 205, a receiver 210, a transmitter 215, a clock 220, a processor 225, a memory 230, an alert circuit 235, a display 240, a user interface 245 and a call quality indicator application 250.

The first antenna 200 intercepts transmitted signals from the communication system 10. The first antenna 200 is coupled to the receiver 210, which employs conventional demodulation techniques for receiving the communication signals transmitted by the communication system 10. Coupled to the receiver 210 is the processor 225 utilizing conventional signal-processing techniques for processing received messages. Preferably, to processor 225 is similar to the MC68328 micro-controller manufactured by Motorola, Inc. of Schaumburg, Ill. It will be appreciated by one of ordinary skill in the art that other similar processors can be utilized for the processor 225, and tat additional processors of the same or alternative type can be utilized as required to handle the processing requirements of the processor 225. The processor 225 decodes an address in the demodulated data of the received message, compares the decoded address with one or more addresses stored in an address memory 255 of the memory 230, and, when a match is detected, proceeds to process the remaining portion of the received message.

To perform the necessary functions of the communication device, the processor 225 is coupled to the memory 230, which preferably includes a random access memory (RAM), a read-only memory (ROM), and an electrically erasable programmable read-only memory (EEPROM)(not shown). The memory 230 includes the address memory 255, a message memory 260, and a call quality threshold memory 265.

Once the processor 225 has processed one or more received messages, it can store the decoded message in the message memory 260 of the memory 230 if desired. It will be appreciated by one of ordinary skill in the art that the message memory 260, in accordance with the present invention, can be a voicemail box or a group of memory locations in a data storage device. In the following description, the term "message memory" refers to any of the memory means mentioned above or an equivalent.

Upon receipt and processing of a message, the processor 225 preferably generates a command signal to the alert circuit 235 as a notification that the message has been received and stored. The alert circuit 235 can include a speaker (not shown) with associated speaker drive circuitry capable of playing melodies and other audible alerts, a vibrator (not shown) with associated vibrator drive circuitry capable of producing a physical vibration, or one or more light emitting diodes (LEDs) (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 235.

Upon receipt and processing of a message, the processor 225 preferably also generates a command signal to the display 240 to generate a visual notification of the receipt and storage of the message. When the display 240 receives the command signal from the processor 225 that the message has been received and stored in the memory 230, a message indication is displayed. The message indication, for example can be the activation of one of a plurality of message icons on the display 240. The display 240 can be, for example, a liquid crystal display utilized to display text and graphics. It will be appreciated by one of ordinary skill in the art that other similar displays such as cathode ray tube displays, organic light emitting diodes, LEDs, or plasma displays can be utilized for the display 240.

The communication device preferably further includes the clock 220. The clock 220 provides timing for the processor 225. The clock 220 can include the current time for use in the operation of the communication device. The clock 220 also provides a source for timing of feature enhancements such as active and inactive periods of operation or periods of alerting. The clock 220 further can provide a source of timing for time-based thresholds for RF inbound and outbound channel quality.

In a preferred embodiment, the communication device includes the call quality indicator application 250. The call quality indicator application 250 can be hard coded or programmed into the communication device during manufacturing, can be programmed over-the-air upon customer subscription, or can be a downloadable application. It will be appreciated that other programming methods can be utilized for programming the call quality indicator application 250 into the communication device. It will be further appreciated by one of ordinary skill in the art that the call quality indicator application 250 can be hardware circuitry within the communication device.

The call quality indicator application 250 preferably provides functionality for providing device users feedback on an overall call quality of the two-way link for each of a plurality of communication calls. The call quality indicator application 250 further preferably provides functionality for providing device users alternate options when the call quality drops below a threshold level. The call quality indicator application 250 utilizes a plurality of call quality threshold levels 270 stored within the call quality threshold memory 265 to provide the desired fimetionslity. For example, when a wireless telephone conversation starts breaking up or fading repeatedly, the users at both ends will be able to gain a better understanding of the link that is having problems using the call quality indicator application 250. In some communication systems having alternate communication modes, such as two-way messaging or two-way radio communication, the call quality indicator application 250 can optionally switch the communication call to one of these alternate modes or provide such option to each device user. Since the alternate modes use different error-correction protocols and have different bandwidth and RF signal quality requirements, they may perform better than typical duplex voice calls under degraded connection quality conditions.

The call quality indicator application 250 further operates using various alert options. In one embodiment, the call quality indicator application 250 notifies the processor 225 to send a command to the alert circuit 235 when new RF channel quality information is received, when the RF channel quality of any examined RF channel is less than the predetermined threshold, or when the a call is terminated. The alert circuit 235 can then generate one or more alerts associated with the particular operation. For example, the alert circuit 235 can generate one alert for a quality communication call, another alert for a terminated call, and yet another alert for new channel quality information being received. Alternatively, no alert can be sent for some of the above-described situations. It will be appreciated by one of ordinary skill in the art that other alerting schemes are within the scope of the present invention.

Preferably, the user interface 245 is coupled to the processor 225. The user interface 245 can be one or more buttons used to generate a button press, a series of button presses, a voice response from the device user, or some other similar method of manual response initiated by the device user of the communication device. The processor 225, in response to receiving a user input via the user interface 245, such as a device user depressing a button or series of buttons, or in response to receipt of a message, initiates a user input signal to the call quality indicator application 250. The call quality indicator application 250, in response to the user input signal, provides the device user with infonnation relating to the two-way link for the current communication call. As previously described, the information can be either displayed on the display 240, alerted, or equivalently indicated to the device user.

The transmitter 215 is coupled to the processor 225 and is responsive to commands from the processor 225. When the transmitter 215 receives a command from the processor 225, the transmitter 215 sends a signal via the second antenna 205 to the communication system 10.

In an alternative embodiment (not shown), the communication device includes one antenna performing the functionality of the first antenna 200 and the second antenna 205. Further, the communication device alternatively includes a transceiver circuit (not shown) performing the functionality of the receiver 210 and the transmitter 215. It will be appreciated by one of ordinary skill in the art that other similar electronic block diagrams of the same or alternate type can be utilized for each of the plurality of communication devices 75.

Figure 4:
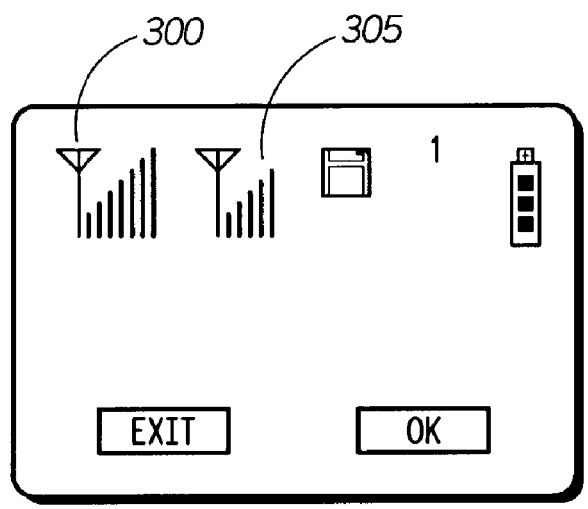
FIGS. 4 and 5 illustrate exemplary embodiments of a display for use within the communication device of FIG. 3.
Figure 5:
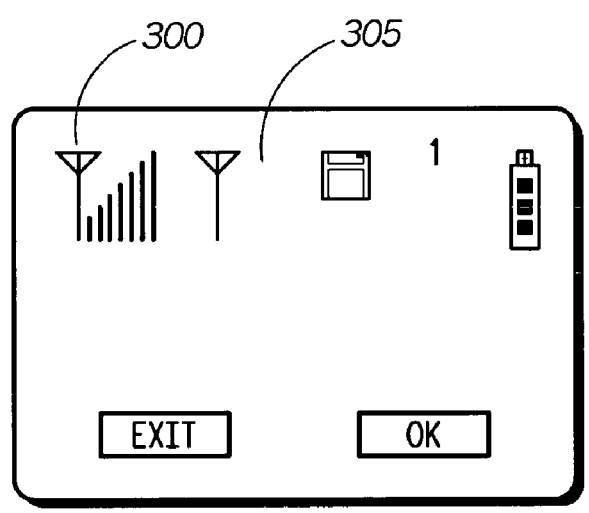

FIGS. 4 and 5 illustrate exemplary embodiments of the display 240 for use within the communication device of FIG. 3. It will be appreciated by one of ordinary skill in the art that communication devices having software-programming capabilities can include specialized and personalized display options and screens for use with the call quality indicator application 250. Alternatively, communication devices that do not include software-programming capabilities can include standard, pre-defined display options and screens for use with the call quality indicator application 250. In accordance with one embodiment of the present invention, the communication device displays a first call quality indicator 300 on the display 240 showing the quality of communication between the originating communication device and the corresponding base station and a second call quality indicator 305 showing the quality of communication between the destination device of the call and the corresponding base station. In other words, the first call quality indicator 300 on the display 240 is associated with the inbound RF channel quality of the inbound RF channel and outbound RF channel quality of the outbound RF channel within which the originating communication device operates. Similarly, the second call quality indicator 305 on the display 240 is associated with the inbound RF channel quality of the inbound RF channel and outbound RF channel quality of the outbound RF channel with which the destination communication device operates.

Preferably, the call quality indicator application 250 determines the first call quality indicator 300 and the second call quality indicator 305 to be displayed based on one or more metrics. Received signal strength indication (RSSI) and bit error rate (BER) are two common methods of estimating signal usability. In an RSSI estimate, the receiver measures the level of a received signal on the desired RF channel. This measurement provides a summation of signal levels (i.e. C+I+N) including the desired information signal (C), the co-channel interference (I), and the noise (N) on the desired RF channel. Although this technique accurately estimates the level of the received signal, it can not distinguish between the desired information signal and signals due to co-channel interference. Thus, an acceptable RSSI measurement may provide unacceptable signal usability due to a high level of co-channel interference. Alternatively, BER measurements provide accurate estimates of signal usability, but in geographic areas where error rates are low, multiple measurements and excessive averaging times may be required to obtain the accurate estimates. Measurement periods as long as ten to fifty seconds may be necessary to obtain accurate BER data. The metrics further can include Mobile Station Power Level, Base Station Power Level, Short Term RSSI, Long Term RSSI, signal strength, co-channel interference metrics, RF signal noise and acoustic output distortion. Alternatively, a more sophisticated algorithm that combines one or more such metrics can be used. Preferably, each quality indicator is determined using an average quality over a sampling period as opposed to an instantaneous reading. The display 240 of FIG. 4 illustrates good two-way link quality for all channels utilized for the communication call. Good quality for example includes all examined channels having a RF channel quality greater than the predetermined threshold (s). The display 240 of FIG. 5 illustrates poor destination link quality. For example, the RF channel quality of either or both of the outbound RF channel and inbound RF channel associated with the destination communication device can be less than the predetermined threshold.

The communication system, communication device, and processes discussed above and the inventive principles thereof are intended to provide meaningful information with regards to communication call quality to assist device users in their everyday communication needs. It is expected that one of ordinary skill given the above described principles, concepts and examples will be able to implement other alternative procedures that are communications device dependent and that will also offer additional quick and efficient processes and systems for call quality indication notification. It is anticipated that the claims below cover many such other examples.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication system for providing call quality indication comprising:

a first communication device allocated a first wireless channel for during a communication, the first wireless channel characterized by a first channel quality, and at least a second communication device allocated at least a second wireless channel for use during the communication, the second wireless channel characterized by a second channel quality; and a system controller operable to communicate the first channel quality and the second channel quality to both the first communication device and the second communication device.

2. A communication system as recited in claim 1, wherein the first wireless channel comprises a first inbound channel from the first communication device to a system receive antenna and a first outbound channel from a system transmit antenna to the first communication device, the first inbound channel being characterized by a first inbound channel quality and the first outbound channel being characterized by a first outbound channel quality, and further wherein the system controller is operable to communicate the first inbound channel quality to both the first communication device and the second communication device.

3. A communication system as recited in claim 1, wherein the second wireless channel comprises a second inbound channel from the second communication device to a system receive antenna and a second outbound channel from a system transmit antenna to the second communication device, the second inbound channel being characterized by a second inbound channel quality and the second outbound channel being characterized by a second outbound channel quality, and further wherein the system controller is operable to communicate the second inbound channel quality to both the first communication device and the second communication device.

4. A communication system as recited in claim 1, wherein the system controller is operable to communicate the first channel quality and the second channel quality to both the first communication device and the second communication device in response to initiation of the communication.

5. A communication system as recited in claim 1, wherein the system controller is operable to repeatedly communicate the first channel quality and the second channel quality to both the first communication device and the second communication device during the communication, regardless of whether either the first channel ciuslityor the second channel quality respectively indicates degradation of the first wireless channel or the second wireless chanel.

6. A communication system as recited in claim 5, wherein the system controller is operable to periodically communicate the first channel quality and the second channel auality to both the first communication device and the second communication device during the communication.

7. A communication system as recited in claim 5, wherein the communication is continued when the first channel quality is at least equal to a first threshold and the second channel quality is at least equal to a second threshold.

8. A communication system as recited in claim 5, wherein the system controller is further operable to communicate one or more alternate communication options to the first communication device and the second communication device when the first channel quality is below a call quality threshold level.

9. A communication system as recited in claim 5, wherein the system controller is further overable to conunuicate one or more alternate communication options to the first communication device and the second communication device when the second channel quality is below a call quality threshold level.

10. A communication system as recited in claim 1, wherein each of the first communication device and the second communication device includes:
a call quality indicator application for providing feedback on an overall call quality for the communication in response to receiving the first channel quality and the second channel quality from the system controller.

11. A communication device operable to wireless communicate with a second communication device through a communication system that includes a system controller, the communication device comprising:
a receiver operable to receive the communication from the communication system over a first wireless channel and further operable to receive a first channel quality and a second channel quality from the system coniroller, the first wireless channel being characterized by the first channel quality, the second channel quality characterizing a second wireless channel used by the second communication device; and
a processor operably coupled to the receiver and operable to execute a call quality indicator application for providing feedback on an overall call quality of the communication based on the first channel quality and the second channel quality.

12. A communication device as recited in claim 11, further comprising:
a memory coupled to the processor and operable to store a plurality of call quality threshold levels,
wherein the call quality indicator application compares each of the first channel quality and the second channel quality to one or more of the plurality of call quality thresholds.

13. A communication device as recited in claim 12, wherein the call quality indicator application provides alternate communication options when the first channel quality or the second channel quality is below the one or more of the plurality of call quality threshold levels.

14. A communication device as recited in claim 12, further comprising:
a display coupled to the processor and operable to display a first call quality indicator associated with the first channel quality, and a second call quality indicator associated with the second channel quality.

15. A conunuication device as recited in claim 14, wherein the call quality indicator application determines the first call quality indicator and the second call quality indicator to be displayed using one or more metrics chosen from a group consisting of: received signal strength indication, bit error rate, mobile station power level, base station power level, short term received signal strength indication, long term received signal strength indication, signal strength, co-channel interference metrics, radio frequency signal noise, and acoustic output distortion.

16. A method of providing call quality indication within a communication system, the method comprising:
monitoring a communication between a first communication device and a second communication device, the first communication device participating in the communication over a first wireless channel and the second communication device participating in the communication over a second wireless channel;
determining a first channel quality of the first wireless channel and a second channel quality of the second wireless channel; and
communicating both the first channel quality and the second channel quality to both the first communication device end the second communication device.

17. A method as recited in claim 16, wherein the step of communicating the first channel quality and the second channel quality comprises:
repeatedly communicating the first channel quality and the second channel quality to both the first communication device and the second communication device during the communication, regardless of whether either the first channel quality or the second channel quality respectively indicates degradation of the first wireless channel or the second wireless channel.

18. A method as recited in claim 17, further comprising:
comparing at least one of the first channel quality and the second channel quality with one or more call quality threshold levels; and terminating the communication when at least one of the first channel quality and the second channel quality is less than the one or more call quality threshold levels.

19. A method as recited in claim 17, wherein the step of repeatedly communicating the first channel quality and the second channel quality comprises:
   periodically communicating the first channel quality and the second channel quality to both the first communication device and the second communication device during the communication.

20. A method as recited in claim 17, further comprising:
   comparing the first channel quality with a first call quality threshold level;
   comparing the second channel quality with a second call quality threshold level; and
   continuing the communication when the first channel quality is at least equal to the first call quality threshold level and the second channel quality is at least equal to the second call quality threshold level.

21. A method as recited in claim 17, further comprising:
   comparing at least one of the first channel quality and the second channel quality with one or more call quality threshold levels; and
   communicating one or more alternate communication options to the first communication device and the second conununication device when at least one of the first channel quality and the second channel quality is less than the one or more call quality threshold levels.

22. A method as recited in claim 16, wherein the first wireless channel includes a first inbound channel and a first outbound channel, wherein the second wireless channel includes a second inbound channel and a second outbound channel, and wherein the step of determining a first channel quality of the first wireless channel and a second channel quality of the second wireless channel comprises:
   determining a channel quality of the first inbound channel to produce the first channel quality; and
   determining a channel quality of the second inbound channel to produce the second channel quality.

23. A method for providing call quality indication within a communication device comprising:
   participating in a communication with at least one other communication device over a first wireless channel;
   receiving a first channel quality associated with the first wireless channel;
   receiving a second channel quality associated a second wireless channel over which the at least one other communication device is participating in the communication;
   displaying a first quality indicator based upon the first channel quality; and
   displaying a second quality indicator based upon the second channel quality.

24. A method as recited in claim 23, further comprising:
   storing at least a first quality threshold level and a second quality threshold level;
   comparing the first channel quality with the first quality threshold level to produce a first comparison; and
   comparing the second channel quality with the second quality threshold level to produce a second comparison;
   wherein the steps of displaying comprise:
   displaying the first quality indicator responsive to the first comparison; and
   displaying the second quality indicator responsive to the second comparison.

25. A method as recited in claim 24, further comprising:
   initiating a second communication between the communication device and the at least one other communication device using an alternate communication option when either the first channel quality is below the first quality threshold level or the second channel quality is below the second quality threshold level.

* * * * *